(12) United States Patent
Nolcheff et al.

(10) Patent No.: US 10,738,692 B2
(45) Date of Patent: Aug. 11, 2020

(54) DISTRIBUTED PROPULSION AND ELECTRIC POWER GENERATION SYSTEM

(71) Applicant: HONEYWELL INTERNATIONAL INC., Morris Plains, NJ (US)

(72) Inventors: Nick Nolcheff, Chandler, AZ (US); John Meier, Phoenix, AZ (US); James Laffan, Phoenix, AZ (US); Alan D. Hemmingson, Tempe, AZ (US); Cristian Anghel, Oro Valley, AZ (US); Mike Koerner, Rancho Palos Verdes, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 391 days.

(21) Appl. No.: 15/709,541

(22) Filed: Sep. 20, 2017

(65) Prior Publication Data
US 2019/0085765 A1   Mar. 21, 2019

(51) Int. Cl.
| F02B 43/08 | (2006.01) |
| F02B 77/14 | (2006.01) |
| F02B 43/00 | (2006.01) |
| H02K 9/04 | (2006.01) |
| B60R 16/03 | (2006.01) |
| H02K 9/16 | (2006.01) |
| H02K 7/18 | (2006.01) |
| F02C 6/00 | (2006.01) |
| F02K 5/00 | (2006.01) |
| B64D 27/24 | (2006.01) |

(52) U.S. Cl.
CPC .............. *F02B 77/14* (2013.01); *B60R 16/03* (2013.01); *B64D 27/24* (2013.01); *F02B 43/00* (2013.01); *F02C 6/00* (2013.01); *F02K 5/00* (2013.01); *H02K 7/1807* (2013.01); *H02K 9/04* (2013.01); *H02K 9/16* (2013.01)

(58) Field of Classification Search
CPC .... F02C 7/32; F02C 7/185; F02K 3/06; F05D 2220/76; B64D 2221/00
USPC .......................................................... 123/3
See application file for complete search history.

(56) References Cited

U.S. PATENT DOCUMENTS

| 4,782,658 A | 11/1988 | Perry |
| 6,467,725 B1 | 10/2002 | Coles et al. |
| 7,622,817 B2 | 11/2009 | El-Refaie et al. |
| 7,841,163 B2 | 11/2010 | Welch et al. |
| 7,973,422 B2 | 7/2011 | Colin et al. |

(Continued)

*Primary Examiner* — Long T Tran
*Assistant Examiner* — James J Kim
(74) *Attorney, Agent, or Firm* — Lorenz & Kopf, LLP (57) ABSTRACT

A propulsion and electric power generation system includes a gas turbine propulsion engine, an electrical generator, an aircraft power distribution system, a plurality of auxiliary fans, and a controller. The gas turbine propulsion engine includes at least a low-pressure turbine coupled to a fan via a low-pressure spool, and the low-pressure turbine is configured to generate mechanical power. The electrical generator is directly connected to the low-pressure spool and generates a total amount of electrical power (Pe). The aircraft power distribution system receives a first fraction (Pa) of the total amount of electrical power. The auxiliary fans receive a second fraction (Pf) of the total amount of electrical power. The controller is configured to control a ratio of Pf to Pa (Pf/Pa) such that the ratio spans a range from less than 0.6 to at least 0.9.

19 Claims, 3 Drawing Sheets

(56) References Cited

U.S. PATENT DOCUMENTS

| | | |
|---|---|---|
| 8,701,381 B2 | 4/2014 | Eames |
| 9,517,843 B2 | 12/2016 | Pesyna et al. |
| 9,548,639 B2 | 1/2017 | Goi et al. |
| 2006/0064960 A1* | 3/2006 | Johnson .................. F02C 7/042 60/226.3 |
| 2006/0174629 A1 | 8/2006 | Michalko |
| 2010/0000226 A1 | 1/2010 | Rensch |
| 2010/0083632 A1 | 4/2010 | Foster et al. |
| 2010/0108806 A1 | 5/2010 | Chan et al. |
| 2011/0140534 A1* | 6/2011 | Yasugi .................... H02J 3/005 307/80 |
| 2013/0000317 A1* | 1/2013 | Berryann ................ F02C 3/113 60/778 |
| 2015/0185716 A1* | 7/2015 | Wichmann ............ F01K 23/101 700/287 |
| 2015/0191252 A1* | 7/2015 | Cline ..................... B64D 31/12 60/39.24 |
| 2015/0337677 A1 | 11/2015 | Roberge |
| 2017/0129617 A1 | 5/2017 | Shah et al. |
| 2017/0159571 A1 | 6/2017 | Sidelkovskiy |
| 2018/0230845 A1* | 8/2018 | Joshi ..................... B64D 27/18 |
| 2018/0266329 A1* | 9/2018 | Mackin ................... F02C 7/36 |
| 2018/0272856 A1* | 9/2018 | Manning ............... B64C 31/032 |
| 2018/0283282 A1* | 10/2018 | Pointon .................... F02K 3/06 |

\* cited by examiner

DISTRIBUTED PROPULSION AND ELECTRIC POWER GENERATION SYSTEM

STATEMENT REGARDING FEDERALLY SPONSORED RESEARCH OR DEVELOPMENT

This invention was made with Government support under FA8650-15-D-2504-0001 awarded by the US Air Force Research Laboratory. The Government has certain rights in the invention.

TECHNICAL FIELD

The present invention generally relates to turbofan gas turbine engines, and more particularly relates to a distributed propulsion and electric power generation system that is implemented using a turbofan gas turbine engine.

BACKGROUND

Electric power demand for aircraft continue to increase. Indeed, some aircraft demand relatively high power requirements—on the order of 1 megawatt—throughout the flight envelope. Even at relatively lower electric power demands, a traditional approach is to avoid encumbering the gas turbine engines responsible for providing thrust to the aircraft by using a separate, dedicated gas turbine engine, also known as an Independent Power Unit (IPU) or Auxiliary Power Unit (APU), to address the need for electric power generation. The use of an IPU/APU resolves the challenges of simultaneously managing the variation in electric power demand and the variation in propulsion power demand.

In a distributed propulsion architecture, with auxiliary fans relying on electrical power, the demand for electrical power generation ($P_e$) increases. As the ratio of power for electrical power generation ($P_e$) relative to the power for aircraft propulsive power generation for thrust ($P_t$) increases, the challenge of meeting both requirements (i.e., $P_e$ and $P_t$) with a propulsion engine becomes increasingly difficult. This is because varying the power extraction from either the high-pressure spool and/or the low-pressure spool to drive a generator can detrimentally impact the stable operating range of the compressor. While the IPU/APU addresses certain challenges in delivering electric power, it adds significant cost, weight, and complexity to the aircraft system. Moreover, with the increase in electrical power demand at relatively high altitudes, the size, weight, and cost of the IPU/APU becomes increasingly prohibitive.

In addition, the increased number of electrical components in newer aircraft emit relative large amounts of heat that should be transported away from the components. A concept that has recently been developed is a turbofan engine configured with two separate, concentric bypass streams, with the outermost stream being designated as the "$3^{rd}$ stream." In some cases, the $3^{rd}$ stream air passes through all the fan stages (if more than one), and in other cases it may only pass through a subset of the stages. This air, like the traditional turbofan bypass air, bypasses the core of the engine. The $3^{rd}$ stream air is sufficiently pressurized, but is also low enough in temperature, to provide effective cooling for the electrical components. Although this $3^{rd}$ stream configuration provides additional cooling, it also exhibits certain drawbacks. For example, it increases the diameter of the engine relative to the baseline turbofan engine that provides only thrust without the additional cooling flow. This increase in diameter is detrimental to aircraft size and weight, especially in aircraft with embedded engines.

Hence, there is a need for an improved system that not only provides for high electric power extraction from the gas turbine propulsion engine, but also provides the component cooling air and the total propulsive thrust needed by the aircraft in a more compact, lighter weight configuration. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a propulsion and electric power generation system includes a gas turbine propulsion engine, an electrical generator, an aircraft power distribution system, a plurality of electrically-powered auxiliary fans, and a controller. The gas turbine propulsion engine includes at least a low-pressure turbine coupled to a fan via a low-pressure spool, and the low-pressure turbine is configured to generate mechanical power. The electrical generator is directly connected to the low-pressure spool and is disposed downstream of the low-pressure turbine. The electrical generator is configured, upon receiving a portion of the mechanical power generated by the low-pressure turbine, to generate a total amount of electrical power ($P_e$). The aircraft power distribution system is electrically coupled to the electrical generator to receive a first fraction ($P_a$) of the total amount of electrical power generated by the electrical generator. The electrically-powered auxiliary fans are electrically coupled to the electrical generator to receive a second fraction ($P_f$) of the total amount of electrical power generated by the electrical generator. The controller is coupled to receive signals that are at least representative of $P_a$ and $P_f$, and the controller is configured, in response to these signals, to control a ratio of $P_f$ to $P_a$ ($P_f/P_a$) such that the ratio spans a range from less than 0.6 to at least 0.9.

In another embodiment, an aircraft propulsion and electric power generation system includes an aircraft, a gas turbine propulsion engine, a plurality of auxiliary fan ducts, an electrical generator, an aircraft power distribution system, a plurality of electrically-powered auxiliary fans, and a controller. The gas turbine propulsion engine is mounted on the aircraft and includes at least a low-pressure turbine coupled to a fan via a low-pressure spool. The low-pressure turbine is configured to generate mechanical power. The auxiliary fan air ducts are disposed within the aircraft. The electrical generator is directly connected to the low-pressure spool and is disposed downstream of the low-pressure turbine. The electrical generator is configured, upon receiving a portion of the mechanical power generated by the low-pressure turbine, to generate a total amount of electrical power ($P_e$). The aircraft power distribution system is electrically coupled to the electrical generator to receive a first fraction ($P_a$) of the total amount of electrical power generated by the electrical generator. The electrically-powered auxiliary fans are electrically coupled to the electrical generator to receive a second fraction ($P_f$) of the total amount of electrical power generated by the electrical generator. Each of the electrically-powered auxiliary fans is disposed within a different one of the auxiliary fan ducts. The controller is coupled to receive signals that are at least representative of $P_a$ and $P_f$, and is configured, in response to these signals, to control a ratio of $P_f$ to $P_a$ ($P_f/P_a$) such that the ratio spans a range from less than 0.6 to at least 0.9. Each electrically-powered auxiliary fan, upon being energized, supplies a flow of air that, upon exiting the fan air duct in which it is disposed, generates a thrust on the fuselage.

In yet another embodiment, an aircraft propulsion and electric power generation system includes an aircraft, a gas turbine propulsion engine, a plurality of auxiliary fan ducts, an electrical generator, an aircraft power distribution system, a plurality of electrically-powered auxiliary fans, and a controller. The gas turbine propulsion engine is mounted on the aircraft and includes at least a low-pressure turbine coupled to a fan via a low-pressure spool. The low-pressure turbine is configured to generate mechanical power. The auxiliary fan air ducts are disposed within the aircraft. The electrical generator is directly connected to the low-pressure spool and is disposed downstream of the low-pressure turbine. The electrical generator is configured, upon receiving a portion of the mechanical power generated by the low-pressure turbine, to generate a total amount of electrical power ($P_e$). The aircraft power distribution system is electrically coupled to the electrical generator to receive a first fraction ($P_a$) of the total amount of electrical power generated by the electrical generator. The electrically-powered auxiliary fans are electrically coupled to the electrical generator to receive a second fraction ($P_f$) of the total amount of electrical power generated by the electrical generator. Each of the electrically-powered auxiliary fans is disposed within a different one of the auxiliary fan ducts. The controller is coupled to receive signals that are at least representative of $P_a$ and $P_f$, and is configured, in response to these signals, to control a ratio of $P_f$ to $P_a$ ($P_f/P_a$) such that the ratio spans a range from less than 0.6 to at least 0.9. Each electrically-powered auxiliary fan, upon being energized, supplies a flow of air that, upon exiting the fan air duct in which it is disposed, generates a thrust on the fuselage. A first fraction of the mechanical power generated by the low-pressure turbine is supplied to the fan for propulsive power generation ($P_t$), a second fraction of the mechanical power generated by the low-pressure turbine is controllably supplied to the electrical generator for generating the total amount of electrical power ($P_e$), and the controller is further coupled to receive signals that are at least representative of $P_e$ and $P_t$, and is further configured, in response to these signals, to control the ratio of $P_f$ to $P_a$ ($P_f/P_a$) such that there is at least one operating condition where $P_f/P_a$ is less than 0.6 when $P_e/P_t$ is greater than 0.3 and at least one other operating condition where $P_f/P_a$ is greater than 0.9 when $P_e/P_t$ is less than 0.1.

Furthermore, other desirable features and characteristics of the propulsion and electric power generation system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
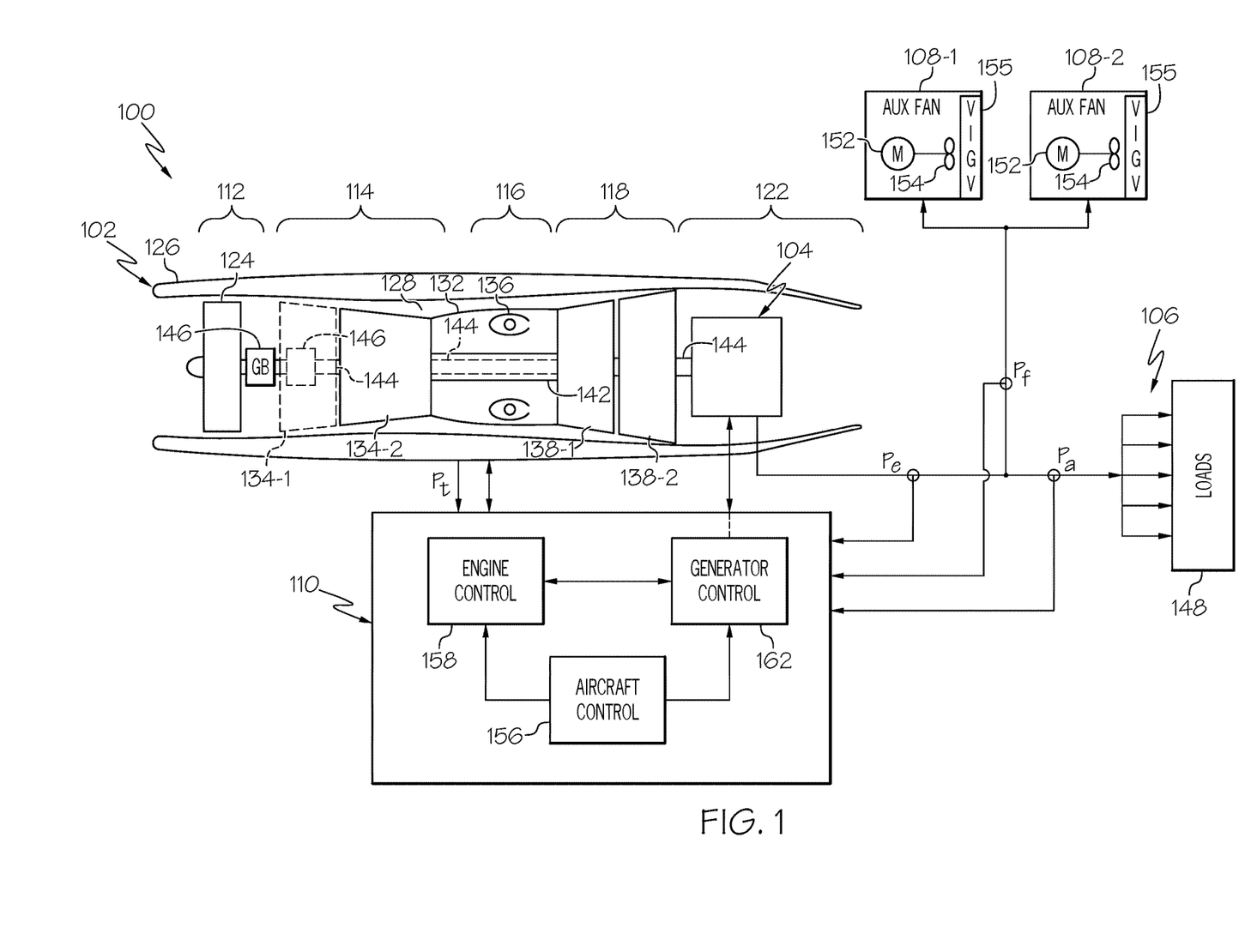
FIG. 1 depicts a functional block diagram of one embodiment of a propulsion and electric power generation system.

Turning now to FIG. 1, a functional block diagram of an exemplary propulsion and electric power generation system 100 is depicted. The depicted system 100 includes a gas turbine propulsion engine 102, an electrical generator 104, an aircraft power distribution system 106, a plurality of auxiliary fans 108 (108-1, 108-2), and a controller 110.

The gas turbine propulsion engine 102 is a dual-spool turbofan gas turbine engine, which includes an intake section 112, a compressor section 114, a combustion section 116, a turbine section 118, and an exhaust section 122. The intake section 112 includes a fan 124, which is mounted in a fan case 126. The fan 124 draws air into the intake section 112 and accelerates and pressurizes it. A fraction of the pressurized air exhausted from the fan 124 is directed through a bypass section 128 disposed between the fan case 126 and an engine cowl 132, and provides a forward thrust. The remaining fraction of air exhausted from the fan 124 is directed into the compressor section 114.

The compressor section 114 may include one or more compressors 134, which raise the pressure of the air directed into it from the fan 124, and directs the compressed air into the combustion section 116. In the depicted embodiment, two compressors are shown—a low-pressure compressor 134-1, and a high-pressure compressor 134-2. The low-pressure compressor 134-1 is depicted in phantom in FIG. 1 because in some embodiments the gas turbine engine 102 may be implemented without a separate low-pressure compressor 134-1. In such embodiments, the fan 124 may be implemented as a multi-stage fan 124.

Whether or not the low-pressure compressor 134-1 is included, it will be appreciated that the high-pressure compressor 134-2 may be variously configured. For example, it may be configured as a multi-stage, axial-centrifugal compressor, or as multi-stage, axial compressor. No matter the particular type of compressor that is used to implement the high-pressure compressor 134-2, the compressed air is directed into the combustion section 116. In the combustion section 116, which includes a combustor assembly 136, the compressed air is mixed with fuel that is controllably supplied to the combustor assembly 136 from a non-illustrated fuel source. The fuel and air mixture is combusted, and the high energy combusted air mixture is then directed into the turbine section 118.

The turbine section 118 includes one or more turbines 138. In the depicted embodiment, the turbine section 108 includes two turbines—a high-pressure turbine 138-1, and a low-pressure turbine 138-2. However, it will be appreciated that the engine 100 could be configured with more or less than this number of turbines. No matter the particular number, the combusted air mixture from the combustion section 106 expands through each turbine 138-1, 138-2, causing it to rotate. The combusted air mixture is then exhausted from the exhaust section 122, providing additional forward thrust. As the turbines 138-1, 138-2 rotate, each drives equipment in the engine 102 via concentrically disposed shafts or spools. Specifically, the high-pressure turbine 138-1 drives the high-pressure compressor 134-2 via a high-pressure spool 142, and the low-pressure turbine 138-2 drives the low-pressure compressor 134-1 (if included) and the fan 124 via a low-pressure spool 144.

As FIG. 1 also depicts, the gas turbine engine 102 may also, at least in some embodiments, include a speed reduction gear box 146. The speed reduction gear box, when included, is generally disposed between the low-pressure turbine 138-2 and the fan 124. In some embodiments, the speed reduction gear box 146 is disposed between the low-pressure compressor 134-1 (if included) and the fan 124. In other embodiments, which is also depicted in phantom in FIG. 1, the speed reduction gear box 146 is disposed within or aft of the low-pressure compressor 134-1 (if included), such that one or more stages of the low-pressure compressor 134-1 are disposed upstream of the speed reduction gear box 146.

The electrical generator 104 is coupled to the low-pressure spool 144, and is disposed downstream of the low-pressure turbine 138-2. More specifically, the electrical generator 104 is directly coupled to the low-pressure spool 144 with no reduction gearing between the low-pressure turbine 138-2 and the electrical generator 104. The electrical generator 104 is configured, upon receiving a portion of the mechanical power generated by the low-pressure turbine 138-2, to generate a total amount of electrical power ($P_e$). The electrical generator 104 may be implemented using any one of numerous types of electrical generators. In one embodiment, the electrical generator 104 is implemented using a high-efficiency wound field generator that is configured to generate up to at least 1.0 megawatt (MW) of electrical power (AC or rectified to 300 VDC or 600 VDC) with an efficiency of about 97%. It will be appreciated, however, that the electrical generator 104 may be configured to generate more or less than this amount of electrical power. For example, it may be configured to generate electrical power in a range from 200 kW to 1.5 MW.

The aircraft power distribution system 106, as is generally known, is used to distribute electrical power to a plurality of electrical loads 148. The aircraft power distribution system 106 is coupled to the electrical generator 104 to receive a first fraction ($P_a$) of the total amount of electrical power ($P_e$) that is generated by the electrical generator 104. Though not depicted in FIG. 1, it will be appreciated that in some embodiments, the aircraft power distribution system 106 may include one or more power conditioning and conversion devices (e.g., rectifiers, inverters, filters, etc.). A description of such devices is not needed, and will not be provided.

Figure 2:
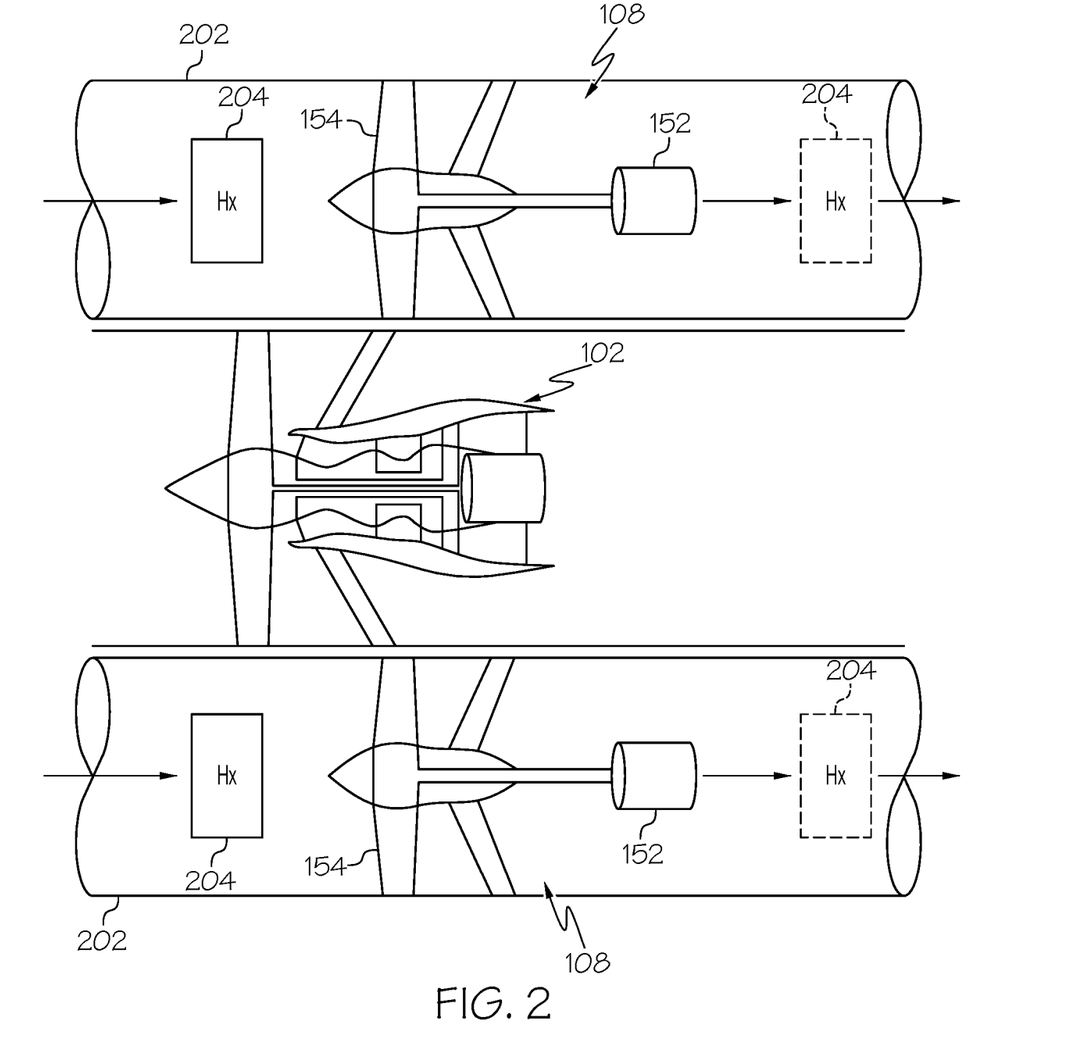
FIG. 2 depicts a simplified schematic representation of auxiliary fans disposed within fan air ducts.

The auxiliary fans 108 are also electrically coupled to the electrical generator 104. Each auxiliary fan 108 is electrically-powered, and thus each includes an electric motor 152 and a fan 154. The auxiliary fans 108 receive a second fraction ($P_f$) of the total amount of electrical power ($P_e$) generated by the electrical generator 104. As used herein, "$P_f$" is the total electrical power supplied to the auxiliary fans 108. Each auxiliary fan 108, upon being energized, supplies a flow of air that may be used to provide thrust and/or cooling air for at least some of the aircraft loads 148. For example, and as shown more clearly in FIG. 2, the system 100 may additionally include a plurality of auxiliary fan air ducts 202. The fan air ducts 202, as shown, are separate from the gas turbine propulsion engine 102, and each has one of the electrically-powered auxiliary fans 108 disposed therein. Thus, the flow of air from the fans 154, upon exiting the fan air ducts 202, generates a thrust. As FIG. 2 also depicts, in some embodiments, the system 100 may include a plurality of heat exchangers 204, with each heat exchanger 204 disposed within a different one of the fan air ducts either upstream or downstream (depicted in phantom in FIG. 2) of the electrically-powered auxiliary fan 108. Thus, the air that flows through the fans 154 may flow through the heat exchangers 204 providing cooling for the aircraft loads 148. It should be noted that although two auxiliary fans 108 are depicted in FIG. 1, the system 100 could be implemented with more or less than this number. In other embodiments, some or all of the air drawn through the auxiliary fans 108 may be directly applied to one or more of the aircraft loads 148.

Returning to FIG. 1, the controller 110 is in operable communication with the propulsion engine 102, the electrical generator 104, the aircraft power distribution system 106, and the auxiliary fans 108, and is coupled to receive signals that are at least representative of $P_a$ and $P_f$. The controller 110 is configured, in response to these signals, to control the ratio of $P_f$ to $P_a$ ($P_f/P_a$) such that the ratio spans a range from less than 0.6 to at least 0.9. Moreover, as FIG. 1 further depicts, the auxiliary fans 108 may also include variable inlet guide vanes (VIGVs) 155. The VIGVs 155, when included, may also be controlled, via the controller 110, to further enhance thrust and cooling flow variability.

As may also be appreciated, because the low-pressure turbine 138-2 is coupled to the fan 124 and the electrical generator 104 (and in some embodiments the low-pressure compressor 134-1), the mechanical power generated by the low-pressure turbine 128-1 is used for both propulsive power generation and electrical power generation. More specifically, a first fraction of the mechanical power generated by the low-pressure turbine 138-2 is supplied to the fan 124 (and low-pressure compressor 134-1, if included) for propulsive power generation ($P_t$), and a second fraction of the mechanical power generated by the low-pressure turbine 138-2 is controllably supplied to the electrical generator 104 for generating the total amount of electrical power ($P_e$).

As FIG. 1 also depicts, the controller is further coupled to receive a signal that is at least representative of $P_t$, and is further configured, in response to this signal and the signal that is at least representative of the total amount of electrical power ($P_e$), to control a ratio of $P_e$ to $P_t$ ($P_e/P_t$). In a particular preferred embodiment, the controller 110 controls this ratio ($P_e/P_t$), during operation of the gas turbine propulsion engine 102, to a range from less than 0.06 to at least 0.4. In a preferred embodiment, the controller 110 is further configured to control the ratio of $P_f$ to $P_a$ ($P_f/P_a$) such that there is at least one operating condition where $P_f/P_a$ is less than 0.6 when $P_e/P_t$ is greater than 0.3 (e.g., a low thrust mode) and at least one other operating condition where $P_f/P_a$ is greater than 0.9 when $P_e/P_t$ is less than 0.1 (e.g., a high thrust mode). As may be appreciated, in the low thrust mode most of the power generated in the system 100 is electric, and most of the electric power is supplied to the aircraft loads 148, and in the high thrust mode most of the power generated in the system 100 is propulsive power, and most of the electric power that is generated is supplied to the auxiliary fans 108.

Although the controller 110 may be variously configured to implement the above-described functionality, in the depicted embodiment the controller 110 is configured to implement an aircraft control 156, an engine control 158, and a generator control 162. The aircraft control 156 controls the overall operation of the system 100 based on the propulsion and electrical demand. The engine control 158 receives commands from the aircraft control 156 and feedback from both the generator control 162 and various non-illustrated sensors in the engine 102. The engine control 158 is configured, in response to the commands and feedback it receives, to control fuel flow to the engine 102. The generator control 162 is coupled to receive commands from the aircraft control 156 and feedback from the engine control 158, the aircraft power distribution system 106, and the auxiliary fans 108. The generator control 162 is configured, in response to the commands and feedback it receives, to control the electrical power generated and supplied by the electrical generator 104 to the aircraft power distribution system 106 and the auxiliary fans 108.

Figure 3:
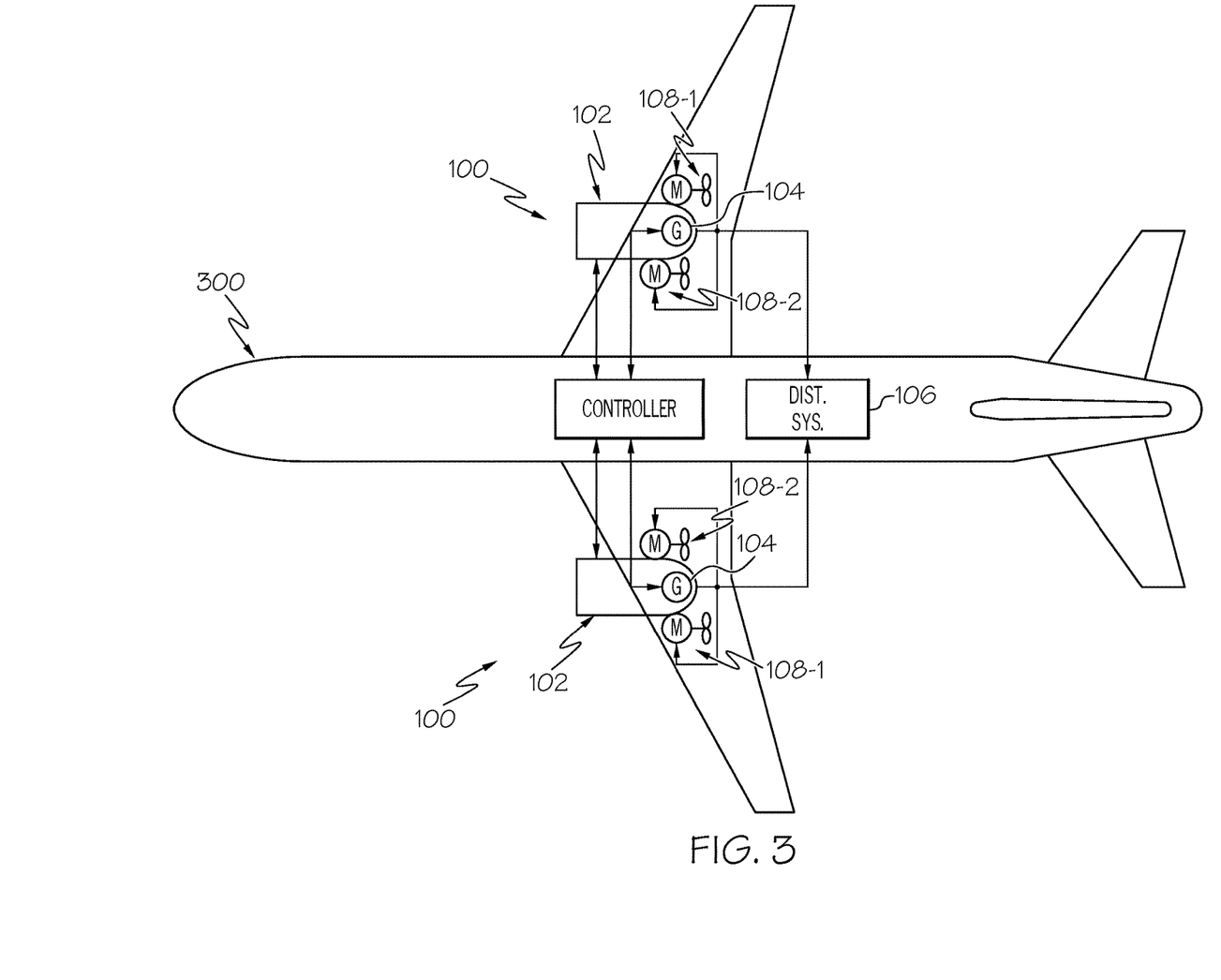
FIG. 3 depicts a functional block diagram of two propulsion and electric power generation systems installed on an aircraft.

The propulsion and electric power generation system 100 described herein is preferably implemented in an aircraft, such as the one depicted in FIG. 3. The aircraft 300 depicted in FIG. 3 is a tube and wing platform, though the system 100 could also be implemented in a blended wing platform. Furthermore, the aircraft 300 is a dual-engine aircraft, and thus includes two of the propulsion and electric power generation systems 100 described herein. Other aircraft may be implemented with only one system.

The propulsion and electric power generation system enables high electric power extraction from a gas turbine propulsion engine, while providing component cooling air and the total propulsive thrust needed by the aircraft, and does so in a more compact, lighter weight configuration.

In one embodiment, a propulsion and electric power generation system includes a gas turbine propulsion engine, an electrical generator, an aircraft power distribution system, a plurality of electrically-powered auxiliary fans, and a controller. The gas turbine propulsion engine includes at least a low-pressure turbine coupled to a fan via a low-pressure spool, and the low-pressure turbine is configured to generate mechanical power. The electrical generator is directly connected to the low-pressure spool and is disposed downstream of the low-pressure turbine. The electrical generator is configured, upon receiving a portion of the mechanical power generated by the low-pressure turbine, to generate a total amount of electrical power ($P_e$). The aircraft power distribution system is electrically coupled to the electrical generator to receive a first fraction ($P_a$) of the total amount of electrical power generated by the electrical generator. The electrically-powered auxiliary fans are electrically coupled to the electrical generator to receive a second fraction ($P_f$) of the total amount of electrical power generated by the electrical generator. The controller is coupled to receive signals that are at least representative of $P_a$ and $P_f$, and the controller is configured, in response to these signals, to control a ratio of $P_f$ to $P_a$ ($P_f/P_a$) such that the ratio spans a range from less than 0.6 to at least 0.9.

These aspects and other embodiments may include one or more of the following features. A first fraction of the mechanical power generated by the low-pressure turbine is supplied to the fan for propulsive power generation ($P_t$), a second fraction of the mechanical power generated by the low-pressure turbine is controllably supplied to the electrical generator for generating the total amount of electrical power ($P_e$), and the controller is further coupled to receive signals that are at least representative of $P_e$ and $P_t$, and is further configured, in response to these signals, to control a ratio of $P_e$ to $P_t$ ($P_e/P_t$), during operation of the gas turbine propulsion engine, to a range from less than 0.06 to at least 0.18. A speed reduction gear box may be disposed between the low-pressure turbine and the fan. The controller is further configured to control the ratio of $P_f$ to $P_a$ ($P_f/P_a$) such that there is at least one operating condition where $P_f/P_a$ is less than 0.6 when $P_e/P_t$ is greater than 0.3 and at least one other operating condition where $P_f/P_a$ is greater than 0.9 when $P_e/P_t$ is less than 0.1. The system may further include a plurality of auxiliary fan air ducts, and each fan air duct has one of the electrically-powered auxiliary fans disposed therein. Each electrically-powered auxiliary fan, upon being energized, supplies a flow of air that, upon exiting the fan air duct in which it is disposed, generates a thrust. At least a portion of the flow of air from one or more of the electrically-powered auxiliary fans may be directly applied to one or more heat loads. The system may further include a plurality of heat exchangers, where each heat exchanger is disposed within a different one of the fan air ducts downstream of the electrically-powered auxiliary fan that is disposed within the same fan air duct, and each electrically-powered auxiliary fan, upon being energized, supplies a flow of air through the heat exchanger that is disposed within the same fan air duct. The electrical generator is configured to generate from 200 kilowatt to about 1.5 megawatt of electrical power.

In another embodiment, an aircraft propulsion and electric power generation system includes an aircraft, a gas turbine propulsion engine, a plurality of auxiliary fan ducts, an electrical generator, an aircraft power distribution system, a plurality of electrically-powered auxiliary fans, and a controller. The gas turbine propulsion engine is mounted on the aircraft and includes at least a low-pressure turbine coupled to a fan via a low-pressure spool. The low-pressure turbine is configured to generate mechanical power. The auxiliary fan air ducts are disposed within the aircraft. The electrical generator is directly connected to the low-pressure spool and is disposed downstream of the low-pressure turbine. The electrical generator is configured, upon receiving a portion of the mechanical power generated by the low-pressure turbine, to generate a total amount of electrical power ($P_e$). The aircraft power distribution system is electrically coupled to the electrical generator to receive a first fraction ($P_a$) of the total amount of electrical power generated by the electrical generator. The electrically-powered auxiliary fans are electrically coupled to the electrical generator to receive a second fraction ($P_f$) of the total amount of electrical power generated by the electrical generator. Each of the electrically-powered auxiliary fans is disposed within a different one of the auxiliary fan ducts. The controller is coupled to receive signals that are at least representative of $P_a$ and $P_f$, and is configured, in response to these signals, to control a ratio of $P_f$ to $P_a$ ($P_f/P_a$) such that the ratio spans a range from less than 0.6 to at least 0.9. Each electrically-powered auxiliary fan, upon being energized, supplies a flow of air that, upon exiting the fan air duct in which it is disposed, generates a thrust on the fuselage.

These aspects and other embodiments may include one or more of the following features. A first fraction of the mechanical power generated by the low-pressure turbine is controllably supplied to the fan for propulsive power generation ($P_t$), a second fraction of the mechanical power generated by the low-pressure turbine is controllably supplied to the electrical generator for generating the total amount of electrical power ($P_e$), and the controller is further coupled to receive signals that are at least representative of $P_e$ and $P_t$, and is further configured, in response to these signals, to control a ratio of $P_e$ to $P_t$ ($P_e/P_t$), during operation of the gas turbine propulsion engine, to a range from less than 0.06 to at least 0.18. The controller is further configured to control the ratio of $P_f$ to $P_a$ ($P_f/P_a$) such that there is at least one operating condition where $P_f/P_a$ is less than 0.6 when $P_e/P_t$ is greater than 0.3 and at least one other operating condition where $P_f/P_a$ is greater than 0.9 when $P_e/P_t$ is less than 0.1. At least a portion of the flow of air from one or more of the electrically-powered auxiliary fans may be directly applied to one or more heat loads. The system may further include a plurality of heat exchangers, where each heat exchanger is disposed within a different one of the fan air ducts downstream of the electrically-powered auxiliary fan that is disposed within the same fan air duct, and each electrically-powered auxiliary fan, upon being energized, supplies a flow of air through the heat exchanger that is disposed within the same fan air duct. The electrical generator is configured to generate from 200 kilowatt to about 1.5 megawatt of electrical power.

In yet another embodiment, an aircraft propulsion and electric power generation system includes an aircraft, a gas turbine propulsion engine, a plurality of auxiliary fan ducts, an electrical generator, an aircraft power distribution system, a plurality of electrically-powered auxiliary fans, and a controller. The gas turbine propulsion engine is mounted on the aircraft and includes at least a low-pressure turbine coupled to a fan via a low-pressure spool. The low-pressure turbine is configured to generate mechanical power. The auxiliary fan air ducts are disposed within the aircraft. The electrical generator is directly connected to the low-pressure spool and is disposed downstream of the low-pressure turbine. The electrical generator is configured, upon receiving a portion of the mechanical power generated by the low-pressure turbine, to generate a total amount of electrical power ($P_e$). The aircraft power distribution system is electrically coupled to the electrical generator to receive a first fraction ($P_a$) of the total amount of electrical power generated by the electrical generator. The electrically-powered auxiliary fans are electrically coupled to the electrical generator to receive a second fraction ($P_f$) of the total amount of electrical power generated by the electrical generator. Each of the electrically-powered auxiliary fans is disposed within a different one of the auxiliary fan ducts. The controller is coupled to receive signals that are at least representative of $P_a$ and $P_f$, and is configured, in response to these signals, to control a ratio of $P_f$ to $P_a$ ($P_f/P_a$) such that the ratio spans a range from less than 0.6 to at least 0.9. Each electrically-powered auxiliary fan, upon being energized, supplies a flow of air that, upon exiting the fan air duct in which it is disposed, generates a thrust on the fuselage. A first fraction of the mechanical power generated by the low-pressure turbine is supplied to the fan for propulsive power generation ($P_t$), a second fraction of the mechanical power generated by the low-pressure turbine is controllably supplied to the electrical generator for generating the total amount of electrical power ($P_e$), and the controller is further coupled to receive signals that are at least representative of $P_e$ and $P_t$, and is further configured, in response to these signals, to control the ratio of $P_f$ to $P_a$ ($P_f/P_a$) such that there is at least one operating condition where $P_f/P_a$ is less than 0.6 when $P_e/P_t$ is greater than 0.3 and at least one other operating condition where $P_f/P_a$ is greater than 0.9 when $P_e/P_t$ is less than 0.1.

These aspects and other embodiments may include one or more of the following features. A first fraction of the mechanical power generated by the low-pressure turbine is supplied to the fan for propulsive power generation ($P_t$), a second fraction of the mechanical power generated by the low-pressure turbine is controllably supplied to the electrical generator for generating the total amount of electrical power ($P_e$), and the controller is further coupled to receive signals that are at least representative of $P_e$ and $P_t$, and is further configured, in response to these signals, to control a ratio of $P_e$ to $P_t$ ($P_e/P_t$), during operation of the gas turbine propulsion engine, to a range from less than 0.06 to at least 0.18. At least a portion of the flow of air from one or more of the electrically-powered auxiliary fans may be directly applied to one or more heat loads. The system may further include a plurality of heat exchangers, where each heat exchanger is disposed within a different one of the fan air ducts downstream of the electrically-powered auxiliary fan that is disposed within the same fan air duct, and each electrically-powered auxiliary fan, upon being energized, supplies a flow of air through the heat exchanger that is disposed within the same fan air duct. The electrical generator is configured to generate from 200 kilowatt to about 1.5 megawatt of electrical power.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, the phrase "coupled to" used in describing a relationship between different elements do not imply that a direct physical connection must be made between these elements. For example, two elements may be connected to each other physically, electronically, logically, or in any other manner, through one or more additional elements.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A propulsion and electric power generation system, comprising:
   a gas turbine propulsion engine including at least a low-pressure turbine coupled to a fan via a low-pressure spool, the low-pressure turbine configured to generate mechanical power;
   an electrical generator directly connected to the low-pressure spool and disposed downstream of the low-pressure turbine, the electrical generator configured, upon receiving a portion of the mechanical power generated by the low-pressure turbine, to generate a total amount of electrical power ($P_e$);
   an aircraft power distribution system electrically coupled to the electrical generator to receive a first fraction ($P_a$) of the total amount of electrical power generated by the electrical generator;
   a plurality of electrically-powered auxiliary fans electrically coupled to the electrical generator to receive a second fraction ($P_f$) of the total amount of electrical power generated by the electrical generator; and
   a controller coupled to receive signals that are at least representative of $P_a$ and $P_f$, the controller configured, in response to these signals, to control a ratio of $P_f$ to $P_a$ ($P_f/P_a$),
   wherein:
      the controller is configured to control the ratio of ($P_f/P_a$) over a range of values,
      the range of values spans from a non-zero value that is less than 0.6 to a value that is at least 0.9,
      a first fraction of the mechanical power generated by the low-pressure turbine is supplied to the fan for propulsive power generation ($P_t$),
      a second fraction of the mechanical power generated by the low-pressure turbine is controllably supplied to the electrical generator for generating the total amount of electrical power ($P_e$), and
      the controller is further coupled to receive signals that are at least representative of $P_e$ and $P_t$, and
      the controller is further configured, in response to the signals that are at least representative of $P_e$ and $P_t$, to control the ratio of $P_f$ to $P_a$ ($P_f/P_a$) such that there is at least one operating condition where $P_f/P_a$ is less than 0.6 when $P_e/P_t$ is greater than 0.3 and at least one other operating condition where $P_f/P_a$ is greater than 0.9 when $P_e/P_t$ is less than 0.1.

2. The system of claim 1, wherein the controller is further configured to control a ratio of $P_e$ to $P_t$ ($P_e/P_t$), during operation of the gas turbine propulsion engine, to a range from less than 0.06 to at least 0.18.

3. The system of claim 1, further comprising:
   a speed reduction gear box disposed between the low-pressure turbine and the fan.

4. The system of claim 1, further comprising:
   a plurality of auxiliary fan air ducts, each fan air duct having one of the electrically-powered auxiliary fans disposed therein.

5. The system of claim 4, wherein each electrically-powered auxiliary fan, upon being energized, supplies a flow of air that, upon exiting the fan air duct in which it is disposed, generates a thrust.

6. The system of claim 4, wherein at least a portion of the flow of air from one or more of the electrically-powered auxiliary fans is directly applied to one or more heat loads.

7. The system of claim 4, further comprising:
   at least one heat exchanger, the at least one heat exchanger disposed within one of the fan air ducts,
   wherein at least one of the electrically-powered auxiliary fans, upon being energized, flows air through the at least one heat exchanger that is disposed within the same one of the fan air ducts.

8. The system of claim 1, wherein the electrical generator is configured to generate from 200 kilowatt to about 1.5 megawatt of electrical power.

9. An aircraft propulsion and electric power generation system, comprising:
   an aircraft;
   a gas turbine propulsion engine mounted on the aircraft and including at least a low-pressure turbine coupled to a fan via a low-pressure spool, the low-pressure turbine configured to generate mechanical power;
   a plurality of auxiliary fan air ducts disposed within the aircraft;
   an electrical generator directly connected to the low-pressure spool and disposed downstream of the low-pressure turbine, the electrical generator configured, upon receiving a portion of the mechanical power generated by the low-pressure turbine, to generate a total amount of electrical power ($P_e$);
   an aircraft power distribution system electrically coupled to the electrical generator to receive a first fraction ($P_a$) of the total amount of electrical power generated by the electrical generator;
   a plurality of electrically-powered auxiliary fans electrically coupled to the electrical generator to receive a second fraction ($P_f$) of the total amount of electrical power generated by the electrical generator, each electrically-powered auxiliary fan disposed within a different one of the auxiliary fan ducts; and
   a controller coupled to receive signals that are at least representative of $P_a$ and $P_f$, the controller configured, in response to these signals, to control a ratio of $P_f$ to $P_a$ ($P_f/P_a$) such that the ratio spans a range from less than 0.6 to at least 0.9,
   wherein:
      the controller is configured to control the ratio of ($P_f/P_a$) over a range of values,
      the range of values spans from a non-zero value that is less than 0.6 to a value that is at least 0.9, and
      each electrically-powered auxiliary fan, upon being energized, supplies a flow of air that, upon exiting the fan air duct in which it is disposed, generates a thrust on the fuselage.

10. The system of claim 9, wherein:
    a first fraction of the mechanical power generated by the low-pressure turbine is supplied to the fan for propulsive power generation ($P_t$),
    a second fraction of the mechanical power generated by the low-pressure turbine is controllably supplied to the electrical generator for generating the total amount of electrical power ($P_e$), and
    the controller is further coupled to receive signals that are at least representative of $P_e$ and $P_t$, and is further configured, in response to these signals, to control the ratio of $P_f$ to $P_a$ ($P_f/P_a$) such that there is at least one operating condition where $P_f/P_a$ is less than 0.6 when $P_e/P_t$ is greater than 0.3 and at least one other operating condition where $P_f/P_a$ is greater than 0.9 when $P_e/P_t$ is less than 0.1.

11. The system of claim 10, wherein the controller is further configured to control a ratio of $P_e$ to $P_t$ ($P_e/P_t$), during operation of the gas turbine propulsion engine, to a range from less than 0.06 to at least 0.18.

12. The system of claim 9, wherein at least a portion of the flow of air from one or more of the electrically-powered auxiliary fans is directly applied to one or more heat loads.

13. The system of claim 9, further comprising:
a plurality of heat exchangers, each heat exchanger disposed within a different one of the fan air ducts,
wherein each electrically-powered auxiliary fan, upon being energized, flows air through the heat exchanger that is disposed within the same fan air duct.

14. The system of claim 9, wherein the electrical generator is configured to generate from 200 kilowatt to about 1.5 megawatt of electrical power.

15. An aircraft propulsion and electric power generation system, comprising:
an aircraft;
a gas turbine propulsion engine mounted on the aircraft and including at least a low-pressure turbine coupled to a fan via a low-pressure spool, the low-pressure turbine configured to generate mechanical power;
a plurality of auxiliary fan air ducts disposed within the aircraft;
an electrical generator directly connected to the low-pressure spool and disposed downstream of the low-pressure turbine, the electrical generator configured, upon receiving a portion of the mechanical power generated by the low-pressure turbine, to generate a total amount of electrical power ($P_e$);
an aircraft power distribution system electrically coupled to the electrical generator to receive a first fraction ($P_a$) of the total amount of electrical power generated by the electrical generator;
a plurality of electrically-powered auxiliary fans electrically coupled to the electrical generator to receive a second fraction ($P_f$) of the total amount of electrical power generated by the electrical generator, each electrically-powered auxiliary fan disposed within a different one of the auxiliary fan ducts; and
a controller coupled to receive signals that are at least representative of $P_a$ and $P_f$, the controller configured, in response to these signals, to control a ratio of $P_f$ to $P_a$ ($P_f/P_a$),
wherein:
the controller is configured to control the ratio of ($P_f/P_a$) over a range of values,
the range of values spans from a non-zero value that is less than 0.6 to a value that is at least 0.9,
each electrically-powered auxiliary fan, upon being energized, supplies a flow of air that, upon exiting the fan air duct in which it is disposed, generates a thrust on the fuselage,
a first fraction of the mechanical power generated by the low-pressure turbine is supplied to the fan for propulsive power generation ($P_t$),
a second fraction of the mechanical power generated by the low-pressure turbine is controllably supplied to the electrical generator for generating the total amount of electrical power ($P_e$), and
the controller is further coupled to receive signals that are at least representative of $P_e$ and $P_t$, and is further configured, in response to these signals, to control the ratio of $P_f$ to $P_a$ ($P_f/P_a$) such that there is at least one operating condition where $P_f/P_a$ is less than 0.6 when $P_e/P_t$ is greater than 0.3 and at least one other operating condition where $P_f/P_a$ is greater than 0.9 when $P_e/P_t$ is less than 0.1.

16. The system of claim 15, wherein the controller is further configured to control a ratio of $P_e$ to $P_t$ ($P_e/P_t$), during operation of the gas turbine propulsion engine, to a range from less than 0.06 to at least 0.18.

17. The system of claim 15, wherein at least a portion of the flow of air from one or more of the electrically-powered auxiliary fans is directly applied to one or more heat loads.

18. The system of claim 15, further comprising:
a plurality of heat exchangers, each heat exchanger disposed within a different one of the fan air ducts,
wherein each electrically-powered auxiliary fan, upon being energized, flows air through the heat exchanger that is disposed within the same fan air duct.

19. The system of claim 15, wherein the electrical generator is configured to generate from 200 kilowatt to about 1.5 megawatt of electrical power.

* * * * *